United States Patent
Hagiwara et al.

(10) Patent No.: US 11,053,976 B1
(45) Date of Patent: Jul. 6, 2021

(54) DOUBLE-ROW CYLINDRICAL ROLLER BEARING

(71) Applicant: HARMONIC DRIVE SYSTEMS INC., Tokyo (JP)

(72) Inventors: Tsuguhisa Hagiwara, Azumino (JP); Yoshiji Nakazawa, Matsumoto (JP); Kazuhisa Taguchi, Matsumoto (JP); Kazuhiko Kurashina, Matsumoto (JP)

(73) Assignee: Harmonic Drive Systems Inc., Tokyo (JP)

( * ) Notice: Subject to any disclaimer, the term of this patent is extended or adjusted under 35 U.S.C. 154(b) by 561 days.

(21) Appl. No.: 16/080,858

(22) PCT Filed: Mar. 30, 2016

(86) PCT No.: PCT/JP2016/060321
§ 371 (c)(1),
(2) Date: Aug. 29, 2018

(87) PCT Pub. No.: WO2017/168611
PCT Pub. Date: Oct. 5, 2017

(51) Int. Cl.
*F16C 33/58* (2006.01)
*F16C 33/60* (2006.01)
*F16C 19/38* (2006.01)

(52) U.S. Cl.
CPC ............ *F16C 19/381* (2013.01); *F16C 19/38* (2013.01); *F16C 33/583* (2013.01); *F16C 33/605* (2013.01)

(58) Field of Classification Search
CPC ...... F16C 19/362; F16C 19/38; F16C 19/381; F16C 19/54; F16C 19/541; F16C 33/583;
(Continued)

(56) References Cited

U.S. PATENT DOCUMENTS 2,430,359 A * 11/1947 Messinger ............ F16C 19/362
                                                    384/622
2,823,083 A *  2/1958 Welton ................... E21B 10/22
                                                     384/96
(Continued)

FOREIGN PATENT DOCUMENTS

GB       2199622 A      7/1988
JP       63172011 A     7/1988
(Continued)

OTHER PUBLICATIONS

International Search Report (PCT/ISA/210) dated Jun. 28, 2016, by the Japanese Patent Office as the International Searching Authority for International Application No. PCT/JP2016/060321.

*Primary Examiner* — Alan B Waits
(74) *Attorney, Agent, or Firm* — Buchanan Ingersoll & Rooney PC

(57) ABSTRACT

A double-row cylindrical roller bearing employs a cross roller bearing for one cylindrical roller bearing and a parallel cylindrical roller bearing for the other cylindrical roller bearing. The relative positions of a first cylindrical roller on the cross roller bearing part side and a second cylindrical roller on the parallel cylindrical roller bearing part side are not restricted in the direction of the bearing center axis lines thereof. As a result, a bearing having high rigidity and being easy to process and assemble can be achieved at low cost. Increase in friction torque in bearing sliding sections and fluctuation in bearing properties can also be suppressed.

2 Claims, 1 Drawing Sheet

(58) Field of Classification Search
CPC .... F16C 33/585; F16C 33/586; F16C 33/605; F16C 39/02
See application file for complete search history.

(56) References Cited

U.S. PATENT DOCUMENTS

| | | | | |
|---|---|---|---|---|
| 4,834,560 | A * | 5/1989 | Jacob | F16C 13/02 384/461 |
| 4,906,113 | A * | 3/1990 | Sague | E02F 9/12 384/507 |
| 5,228,788 | A * | 7/1993 | Vinciguerra | F16C 19/26 29/447 |
| 9,188,154 | B2 * | 11/2015 | Magny | F16J 15/3236 |
| 10,495,142 | B2 * | 12/2019 | Bouron | F16C 33/586 |
| 2014/0314358 | A1 * | 10/2014 | Seubert | F16C 35/077 384/454 |

FOREIGN PATENT DOCUMENTS

| | | |
|---|---|---|
| JP | 480753 U | 7/1992 |
| JP | 544720 A | 2/1993 |
| JP | 5193098 A | 8/1993 |
| JP | 2003074672 A | 3/2003 |
| WO | 2009020087 A1 | 2/2009 |

* cited by examiner

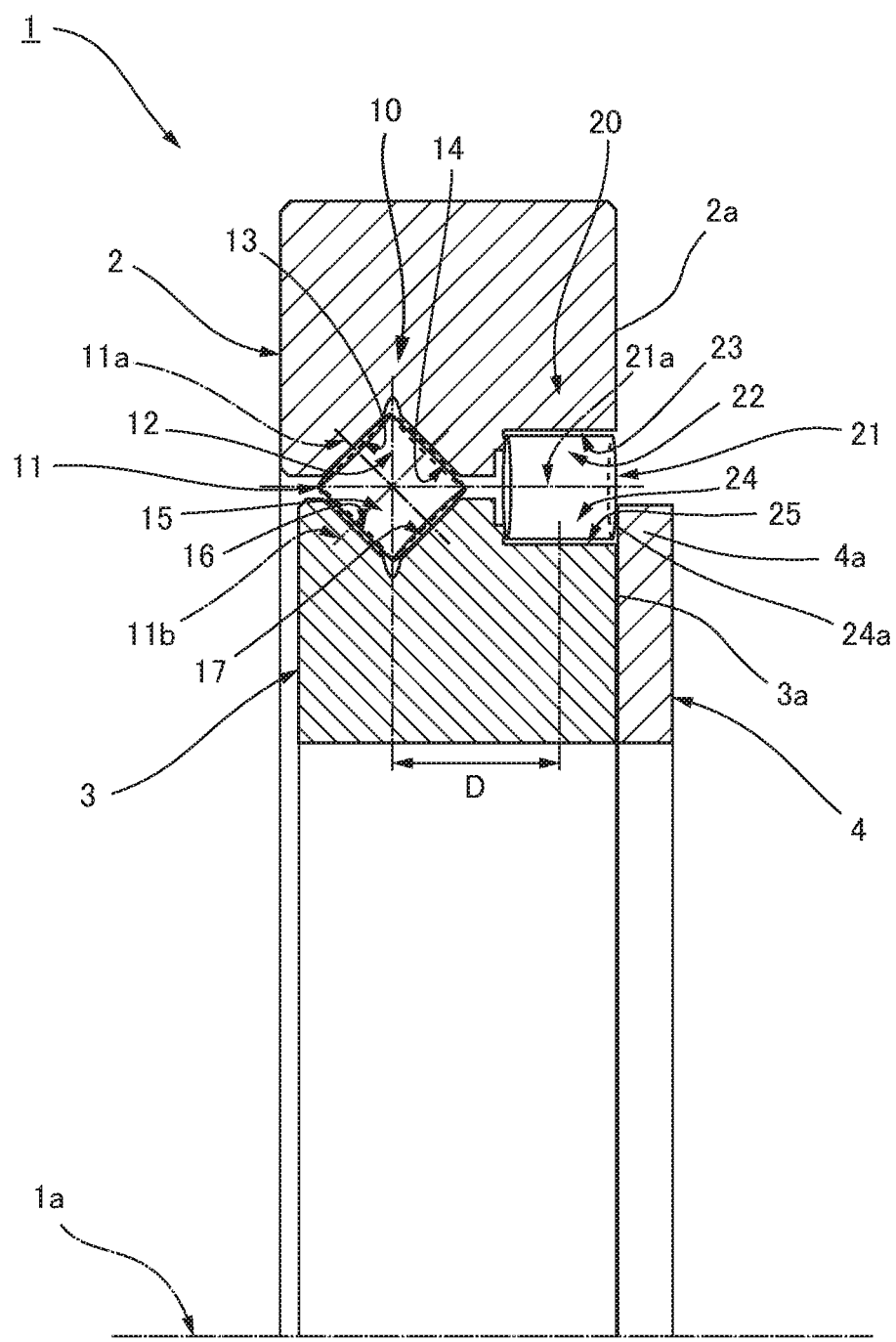

DOUBLE-ROW CYLINDRICAL ROLLER BEARING

TECHNICAL FIELD

The present invention relates to a double-row cylindrical roller bearing that has high rigidity and is easy to process and assemble.

BACKGROUND ART

The double-row angular cylindrical roller bearings disclosed in patent documents 1 and 2 are known as cylindrical roller bearings having high rigidity. In a double-row angular cylindrical roller bearing, two roller raceways are formed between inner and outer races, and a cylindrical roller disposed at an incline at an angle of 45° in one direction is rollably inserted into each of the roller raceways. Between the cylindrical roller inserted into one roller raceway and the cylindrical roller inserted into the other roller raceway, the directions of inclination are opposite, and the roller center axis lines are orthogonal to each other.

A double-row angular cylindrical roller bearing is capable of receiving both an axial load acting along a direction parallel to the bearing center axis line and a radial load acting along a bearing radial direction. In addition, a double-row angular cylindrical roller bearing has greater rigidity and a greater load capacity than does a cross-roller bearing having the same outside diameter.

PRIOR ART DOCUMENT

Patent Document

Patent document 1: JP 5-44720 A
Patent document 2: WO 2009/020087

SUMMARY OF THE INVENTION

Problems to be Solved by the Invention

In a double-row angular cylindrical roller bearing, an outer-race-side raceway surface and an inner-race-side raceway surface, which define the roller raceways formed between the inner and outer races, are inclined by 45° relative to the bearing center axis line. Therefore, in a state where cylindrical rollers are inserted into the two roller raceways, the cylindrical rollers inserted into the left and right roller raceways are sandwiched from the direction of the bearing center axis line by the outer-race-side raceway surface and the inner-race-side raceway surface. Specifically, the relative positions of the two rows of cylindrical rollers in the direction of the bearing center axis line are restricted.

Therefore, in a state where the inner and outer races are put together so that the cylindrical rollers are inserted therebetween, it is necessary for each of a pair of inner-race-side raceway surfaces and a pair of outer-race-side raceway surfaces to face each other with high precision in the direction of the bearing center axis line. For this purpose, deviation of the inner- and outer-race raceway surfaces in the direction of the bearing center axis line must be kept to no greater than several microns, which is the level of variation in the roller diameter of the cylindrical rollers. Accordingly, processing and putting together of the inner and outer races must be performed with high precision, and the manufacturing costs also increase.

When the deviation of the inner-race raceway surfaces and outer-race raceway surfaces in the direction of the bearing center axis line is large due to, inter alia, error in processing the inner and outer races, problems are presented in that it is difficult to assemble the bearings, excessive force is applied to the raceway surfaces or cylindrical rollers, friction torque at sliding portions of the raceway surfaces and cylindrical rollers increases, and variation in bearing performance also increases.

In the prior art, cylindrical rollers having a smaller diameter than in the case of a cross roller bearing of the same size are employed in order to avoid such problems. Therefore, the rated load of the bearings is low.

In view of such issues, an object of the present invention is to provide a double-row cylindrical roller bearing that has high rigidity and is easy to process and assemble.

Means of Solving the Problems

In order to solve the above problems, in a double-row cylindrical roller bearing of the present invention, a cross roller bearing is employed for one cylindrical roller bearing and a parallel cylindrical roller bearing is employed for the other cylindrical roller bearing. The relative positions of the cylindrical rollers on the cross roller bearing side and the cylindrical rollers on the parallel cylindrical roller bearing side are not restricted in the direction of the bearing center axis line.

Accordingly, the need to raise the precision of processing and assembly of the inner and outer races to the tolerance level of the cylindrical rollers is obviated, processing and assembly are facilitated, and cost can be reduced. In addition, increases in the friction torque, variation in bearing performance, etc., which are caused by error in the processing or assembly of the inner and outer races, can be suppressed. Furthermore, because the size of cylindrical rollers does not need to reduce, the strength of the bearing can be kept from decreasing.

BRIEF DESCRIPTION OF THE DRAWINGS

FIG. 1 is a half cross-sectional view of a double-row cylindrical roller bearing to which the present invention is applied.

MODE FOR CARRYING OUT THE INVENTION

An embodiment of a double-row cylindrical roller bearing to which the present invention is applied is described below with reference to FIG. 1. The double-row cylindrical roller bearing 1 is provided with an outer race 2, an inner race 3, a cross roller bearing section 10 formed on one side in the direction of a bearing center axis line 1a between the outer race 2 and the inner race 3, and a parallel cylindrical roller bearing section 20 formed on the other side in the direction of the bearing center axis line 1a between the outer race 2 and the inner race 3. In the description below, cylindrical rollers arranged in the cross roller bearing section 10 are referred to as first cylindrical rollers 11, and those arranged in the parallel cylindrical roller bearing section 20 as second cylindrical rollers 21.

The cross roller bearing section 10 is provided with a V-shaped raceway groove 12 on the circular inner peripheral surface of the outer race 2. The V-shaped raceway groove 12 is defined by inclined raceway surfaces 13 and 14 which are inclined in opposite directions by 45° relative to the bearing center axis line 1a so as to be orthogonal with each other.

Similarly, a V-shaped raceway groove 15 is formed on the circular outer peripheral surface of the inner race 3. The V-shaped raceway groove 15 is defined by inclined raceway surfaces 16 and 17 which are inclined in opposite directions by 45° relative to the bearing center axis line 1a so as to be orthogonal with each other.

The first cylindrical rollers 11 are arranged along the inclined raceway surfaces 13, 14, 16 and 17 in a state in which the roller center axis lines thereof are alternately crossed orthogonally. Among the first cylindrical rollers 11, those inclined to one side (the roller center axis lines of which extend in the direction of dotted lines 11a) roll along the inclined raceway surfaces 14 and 16, whereas those inclined to the other side (the roller center axis lines of which extend in the direction of dotted lines 11b) roll along the inclined raceway surfaces 13 and 17.

The parallel cylindrical roller bearing section 20 is provided with a rectangular raceway groove 22 having a fixed depth and formed on the circular inner peripheral surface of the outer race 2. A parallel raceway surface 23, which is parallel to the bearing center axis line 1a, is formed on the groove bottom surface of the rectangular raceway groove 22. Similarly, a rectangular raceway groove 24 having a fixed depth is formed on the circular outer peripheral surface of the inner race 3, and a parallel raceway surface 25 parallel to the bearing center axis line 1a is formed on the groove bottom surface of the rectangular raceway groove 24. The second cylindrical rollers 21 are arranged along a pair of the parallel raceway surfaces 23 and 25 in a state in which the roller center axis line 21a thereof is in parallel with the bearing center axis line 1a.

The cross roller bearing section 10 may be a full complement cross roller bearing, or a cross roller bearing provided with a retainer (not shown in the drawing) for retaining the respective first cylindrical rollers 11 at a fixed interval. Similarly, the parallel cylindrical roller bearing section 20 may be a full complement cylindrical roller bearing, or a cylindrical roller bearing provided with a retainer (not shown in the drawing) for retaining the respective second cylindrical rollers 21 at a fixed interval.

In the parallel cylindrical roller bearing section 20 of this example, the rectangular raceway grooves 22 and 24 formed in the outer race 2 and the inner race 3 are open to the end surfaces 2a and 3a of the outer and inner races 2 and 3. An annular roller presser 4 (retainer presser) having a fixed thickness is attached to the annular end surface 3a of the inner race 3. The roller presser 4 has an outer peripheral edge portion 4a for covering a radially-inner-peripheral-side portion of the groove opening 24a that exposes on the end surface 3a. The roller presser 4 prevents the second cylindrical rollers 21 (or a retainer) from falling out of the rectangular raceway grooves 22 and 24 in the bearing center axis line 1a.

In an assembled state of the cross roller bearing section 10, a state is established in which slight pressure in the direction of the bearing center axis line 1a is being applied between the outer race 2 and the inner race 3. Whereas, in the parallel cylindrical roller bearing section 20, a small gap in the radial direction (radial gap) is formed between the outer peripheral surface of the second cylindrical roller 21 and the parallel raceway surface 23 or between the outer peripheral surface of the second cylindrical roller 21 and the parallel raceway surface 25. Specifically, the interval, which is formed between the outer-race-side parallel raceway surface 23 and the inner-race-side parallel raceway surface 25 in an assembled state, is set slightly larger than the outside diameter of the second cylindrical roller 21.

The cross roller bearing section 10 is capable of bearing radial load, axial load and momentum, while the parallel cylindrical roller bearing section 20 is capable of bearing radial load and momentum. The radial gap is formed between the second cylindrical roller 21 and the parallel raceway surface 23 or between the second cylindrical roller 21 and the parallel raceway surface 25 in the parallel cylindrical roller bearing section 20 in this example as mentioned above. Therefore, the cross roller bearing 10 mainly bears load. Specifically, in a case of light load, the cross roller bearing section 10 mainly receives the applied load. In a case of heavy load in which radial load and momentum are large, the cross roller bearing section 10 is deformed and the parallel cylindrical roller bearing section 20 shares the radial load and momentum.

According to the double-row cylindrical roller bearing 1 with this configuration, in the cross roller bearing section 10, the position of the first cylindrical roller 11 in the bearing center axis line 1a is restricted by the inclined raceway surfaces 13, 14, 16 and 17 that define the V-shaped raceway grooves 12 and 15 formed between the outer and inner races. In contrast, the second cylindrical roller 21 of the parallel cylindrical roller bearing section 20 is movable in the direction of the bearing center axis line 1a along the parallel raceway surfaces 23 and 25 formed in the outer and inner races, and therefore is not restricted in movement in the bearing center axis line 1a. This means that the relative positional relationship of the first and second cylindrical rollers 11 and 21 in the direction of the bearing center axis line 1a is not fixed (the roller inter-center distance D of FIG. 1 is not fixed). The dimension tolerance in the direction of the bearing center axis line 1a of the V-shaped raceway grooves 12 and 15 and the rectangular raceway grooves 22 and 24, which are formed in the outer and inner races, is not needed to be the same level as that of the dimension tolerance required for the first and second cylindrical rollers 11 and 21, but is suffice to be the general tolerance.

Accordingly, it is possible to achieve a bearing that has high rigidity and is easy to process and assemble at low cost.

In addition, in an assembled state, the first and second cylindrical rollers 11 and 21 are prevented or suppressed from being applied with unnecessary force, whereby reducing friction torque in the sliding sections and stabilizing bearing performance. Furthermore, there is no need to lower the size of the first and second cylindrical rollers in order to facilitate processing and assembly, decrease in friction torque, etc.

The invention claimed is:

1. A double-row cylindrical roller bearing comprising:
an outer race and an inner race;
a cross roller bearing section formed on one side in a direction of a bearing center axis line between the outer race and the inner race, and a parallel cylindrical roller bearing section formed on the other side;
a plurality of first cylindrical rollers arranged in the cross roller bearing section; and
a plurality of second cylindrical rollers arranged in the parallel cylindrical bearing section,
wherein, in the cross roller bearing section, the outer race and the inner race are respectively formed with V-shaped raceway grooves; each of the V-shaped raceway grooves is defined by inclined raceway surfaces that are inclined in opposite directions at 45° relative to the bearing center axis line and that are orthogonal with each other; and the first cylindrical rollers are arranged along the inclined raceway surfaces in a state in which roller center axis lines of the first cylindrical rollers are alternately orthogonal with each other, wherein, in the parallel cylindrical roller bearing section, the outer race and the inner race are respectively formed with rectangular raceway grooves; parallel raceway surfaces parallel to the bearing center axis line are formed on groove bottom surfaces of the respective rectangular raceway grooves; and the second cylindrical rollers are arranged along the parallel raceway surfaces in a state in which roller center axis lines of the second cylindrical rollers are parallel to the bearing center axis line, and wherein a radial gap is formed between an outer peripheral surface of the second cylindrical rollers and the parallel raceway surfaces in the parallel cylindrical roller bearing section.

2. The double-row cylindrical roller bearing according to claim 1, wherein the rectangular raceway grooves are open to end surfaces of the outer race and the inner races on a side of the parallel cylindrical roller bearing section; and a roller presser for preventing the second cylindrical rollers from falling out of the rectangular raceway grooves is attached to the end surface of the inner race.

* * * * *